United States Patent

[11] 3,614,656

[72] Inventors Edward A. Pinsley
Glastonbury;
Clyde O. Brown, Newington, both of Conn.
[21] Appl. No. 710,696
[22] Filed Feb. 23, 1968
[45] Patented Oct. 19, 1971
[73] Assignee United Aircraft Corporation
East Hartford, Conn.

[54] GAS LASER
16 Claims, 15 Drawing Figs.
[52] U.S. Cl. ...................................... 331/94.5,
332/7.51
[51] Int. Cl. ...................................... H01s 3/02
[50] Field of Search ........................... 331/94.5

[56] References Cited
UNITED STATES PATENTS
3,391,281 7/1968 Berkens .................. 331/94.5 UX OTHER REFERENCES
Atomic and Molecular Process by D. R. Bates, 1962, A.P.; Soviet Physics Uspekhi, Vol. 10, #2 Sept.-Oct. 1967, Carbon Dioxide Lasers by Soboleve & Sokovikov; Physics of Fluids, Vol. 8, #9, Sept. 1965 pg. 1601– 1607 by Huble & Hertzberg; Laser Focus, 2/67, pg. 26– 32, Design and use of a U.V. Laser by D. A. Leonard Primary Examiner—Rodney D. Bennett, Jr.
Assistant Examiner—N. Moskowitz
Attorney—Melvin Pearson Williams ABSTRACT: Carbon dioxide is injected into a stream of excited nitrogen by means of one or more manifolds or rods located directly within the laser chamber, disposed adjacent to and movable relative to the laser cavity.

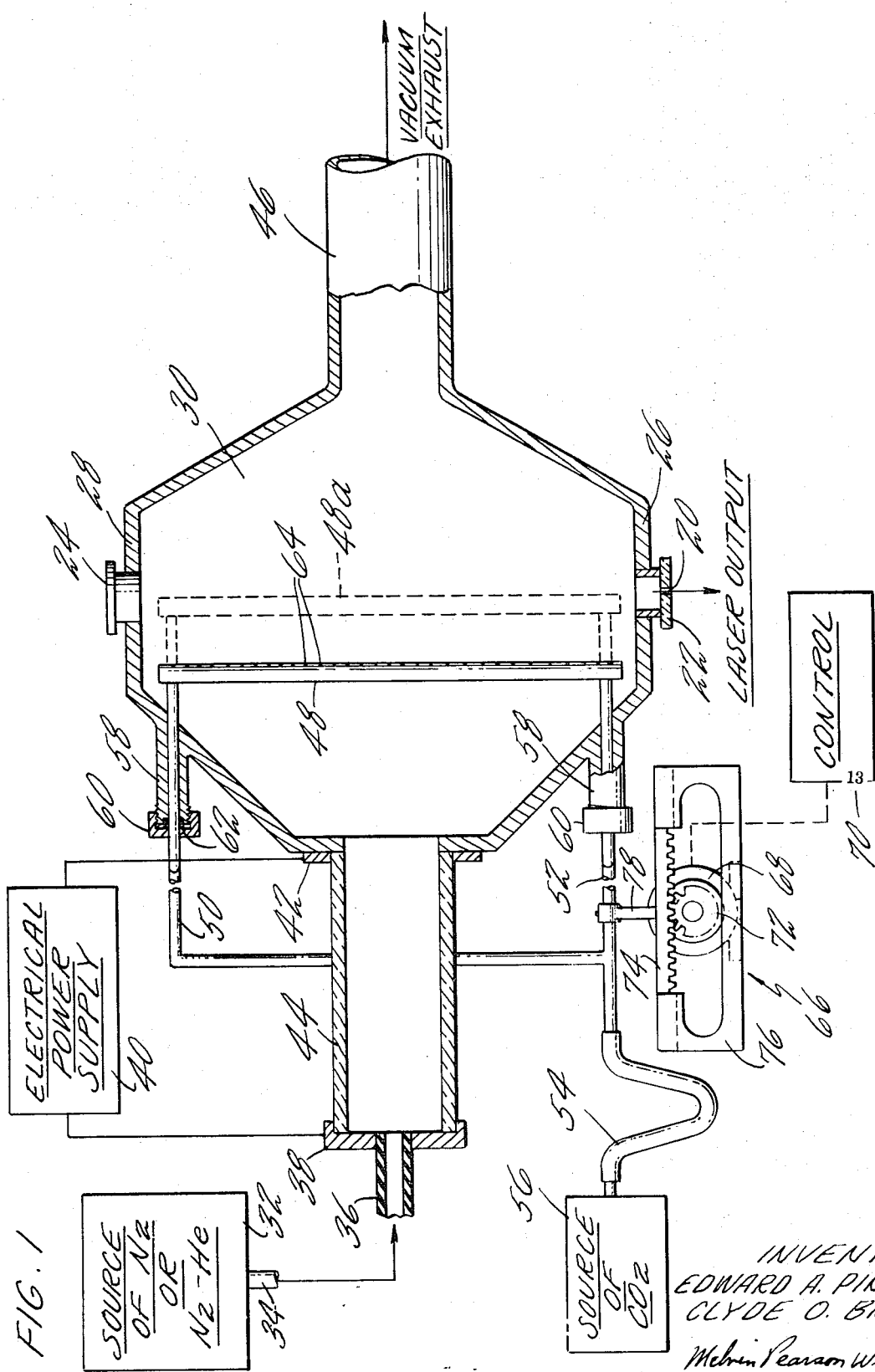

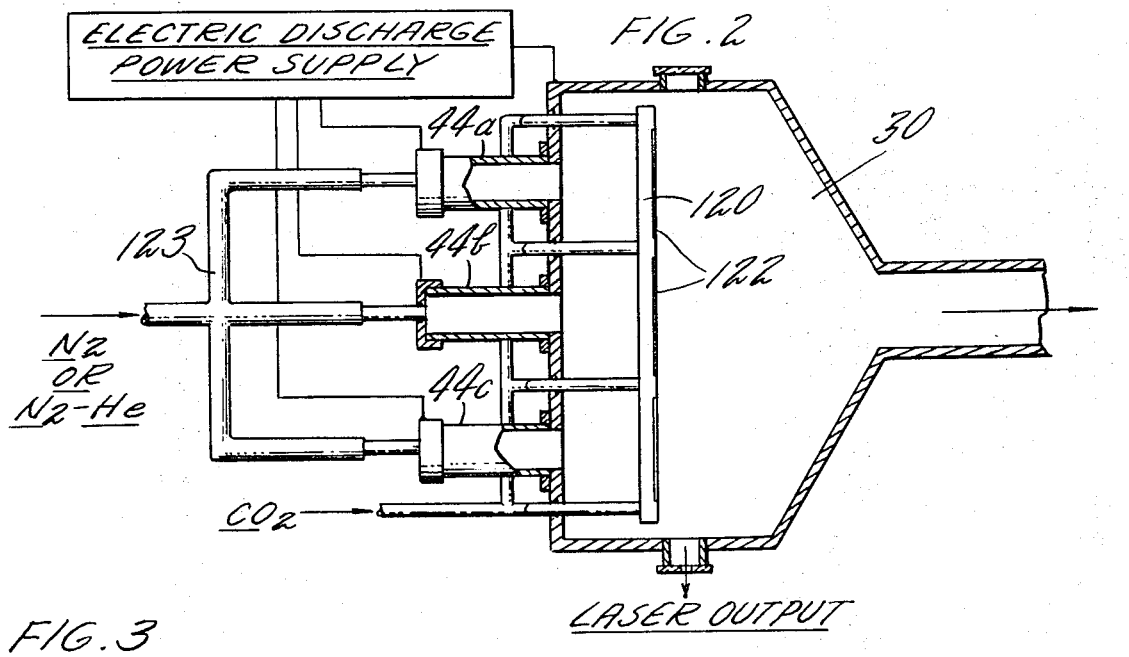
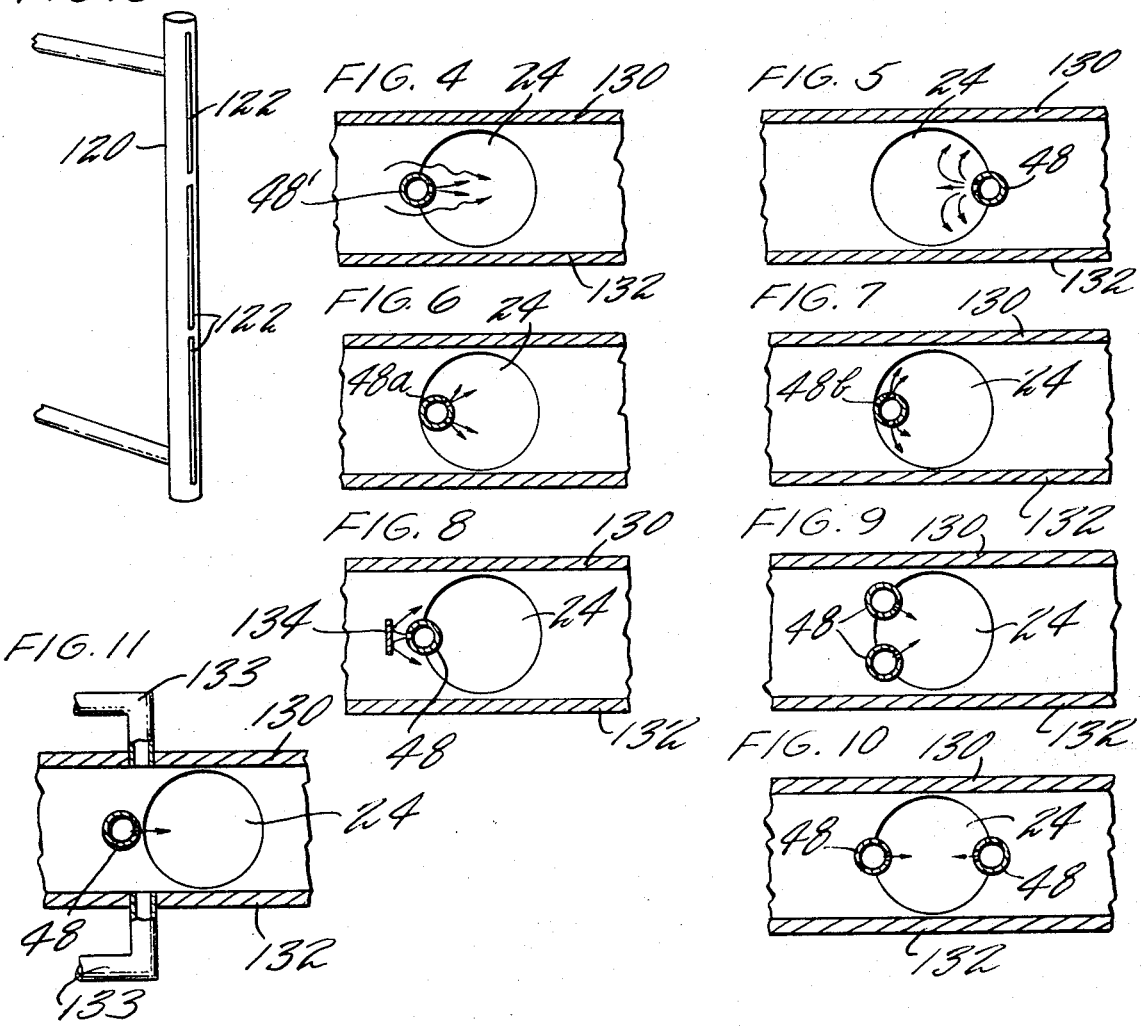

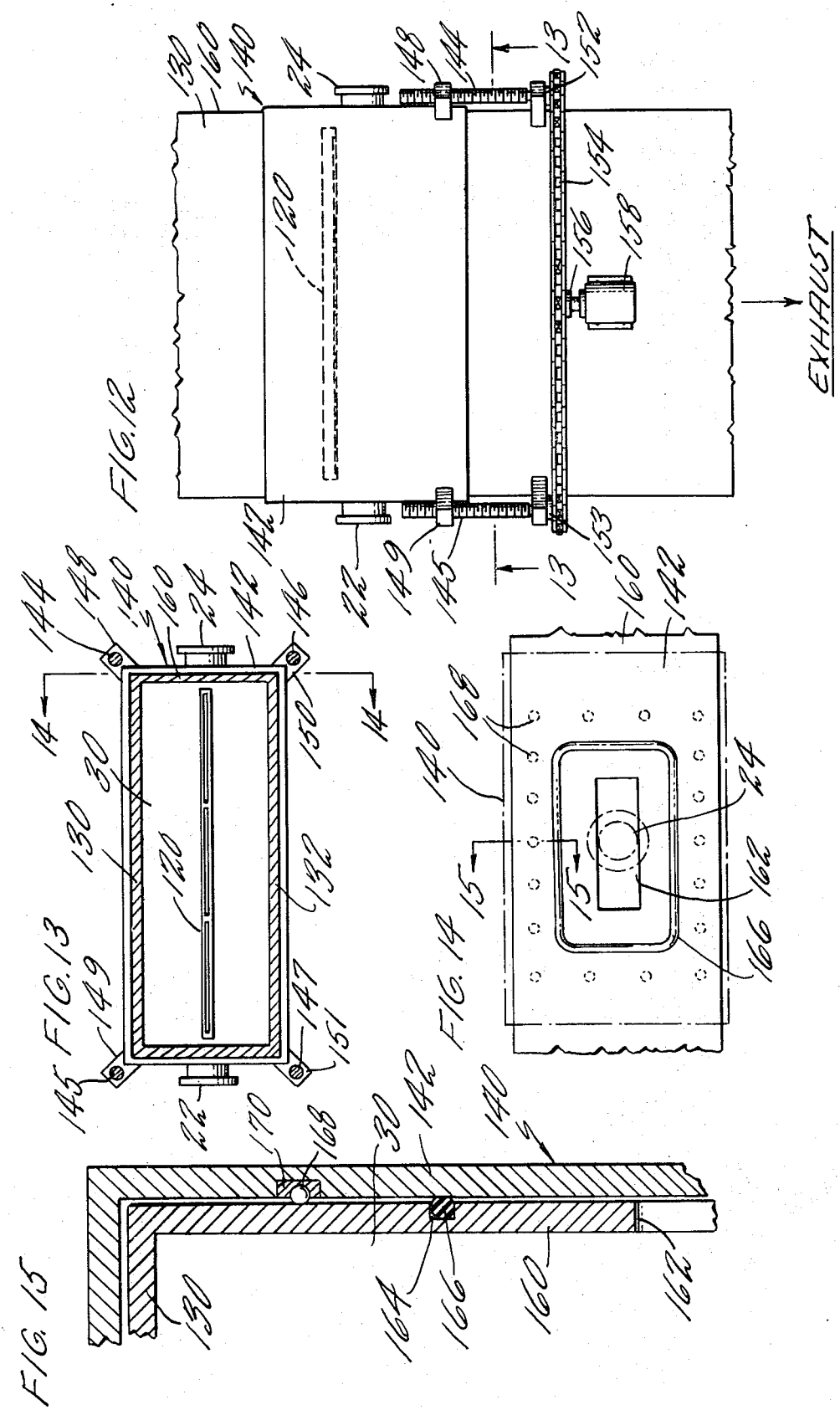

GAS LASER

CROSS-REFERENCE TO RELATED APPLICATIONS

A high-power gas-mixing laser is disclosed in a copending U.S. Pat. application of the same assignee entitled "Gas Mixing Laser," filed on even date herewith by B. R. Bronfin et al., Ser. No. (UAC Docket No. R-1096). A system for injecting solid lasing substance in a gas-mixing laser is disclosed in a copending application of the same assignee entitled "Controlled Lasing in Gas Lasers by Injection of Solid Particles of Lasing Substance," filed on even date herewith by C. M. Banas et al., Ser. No. (UAC Docket R-1177). A gas-mixing laser with electric excitation is shown in a copending application of the same assignee filed on even date herewith by C. O. Brown et al. entitled "Electrically Excited Gas Mixing Laser," Ser. No. (UAC Docket No. R-1229).

BACKGROUND OF THE INVENTION

1. Field of Invention

This invention relates to gas dynamic mixing lasers, and more particularly to measn and methods for injecting the lasing substance into a flow of electrically excited gas.

2. Description of the Prior Art

Gas lasers involve the excitation (or pumping) of one species of gas (hereinafter referred to as the energizing gas) to high levels of excitation. In some cases, electronic levels of excitation are achieved; however, preferred operation with molecular gases involves the excitation of the energizing gas to the first or subsequent levels of vibrational excitation. The energy in the energizing gas is thereafter transferred through near resonant vibrational energy transfer via collisions between the energizing gas and the lasing gas. This causes the lasing gas to achieve a population inversion between the upper laser excitation level relative to a lower laser excitation level. A beam of electromagnetic radiation wil be amplified in intensity by stimulated emission as it passes through a gas with such a population inversion, giving rise to laser action. With a set of mirrors forming a Fabray-Perot cavity located at either end of the gas enclosure, the beam is reflected repeatedly and continues to increase in intensity. If one of the mirrors is partially transparent or has holes with diameters small compared to the transverse beam dimension, portions of the beam will emerge from the cavity. A device producing this effect is referred to as a laser, when the radiation is in the visible or near infrared portion of the spectrum.

In the aforementioned Brown et al. and Bronfin et al. applications, there are described thermally and electrically excited gas laser systems which utilize the injection of carbon dioxide into a stream of excited nitrogen, the injection taking place in the region of the laser chamber itself. This differs from previous gas lasers wherein the excitation of the energizing gas. It also differs from systems wherein the energizing gas may be separately excited but the configuration and dynamic conditions are such that the optical cavity has within it carbon dioxide at the lower laser level of excitation, in the ground state, and in various other low levels of excitation which result in absorption of photons thus reducing the laser output.

SUMMARY OF INVENTION

The principal object of the present invention is to provide a very high power laser with high power density and efficiency.

Another object of the present invention is to provide a high-power laser capable of adjustment to optimum operating conditions for maximum efficiency at varying power levels.

According to the present invention, a lasing substance is injected into a beam of energizing gas directly within the laser chamber, in close proximity with the optical cavity. The velocity of the mixed flow is substantially perpendicular to the optical caity axis.

In further accord with the present invention, the lasing substance is injected substantially along the entire length to provide sudden and intimate mixing with the energizing gas.

In accordance still further with the present invention, the precise point of injection of the lasing substance relative to the optical cavity is adjustable so as to optimize operating conditions with respect to all of the dynamic parameters thereof.

The present invention is predicated on the concept that a marked increase in operating pressure and hence power density as well as high efficiency isachievable by controlling the exact location, direction and means relative to the optical cavity of an electrically excited laser at which the lasing substance is brought into energy transfer relationship with the energizing gas. The present invention therefore permits operation of electrically excited lasers with output power densities some orders of magnitude higher than has heretofore been obtainable.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a schematized, semipictorial, sectional plan view of a gas dynamic laser illustrating a simple embodiment of the present invention.

FIG. 2 is a semipictorial, simplified sectioned plan view of a multiple discharge variation of the embodiment of FIG. 1 utilizing a slotted manifold;

FIG. 3 is a perspective view of a slotted manifold of the type illustrated in the embodiment of FIG. 4;

FIGS. 4–11 are simplifed, sectioned partial side elevations of the laser chamber illustrating various configurations of the lasing substance injection according to the present invention;

FIG. 12 is a partial semipictorial plan view of a second embodiment of the present invention in which the position of the optical cavity is adjustable relative to that of the injection manifold;

FIG. 13 is a simplified, sectioned end view taken on the line 13—13 of FIG. 12;

FIG. 14 is a simplified, sectioned, partial side view taken on the line 14—14 of FIG. 13, with an outer member shown in phantom;

and FIG. 15 is a partial, sectioned elevation taken on the line 15—15 of FIG. 14.

DESCRIPTION OF THE PREFERRED EMBODIMENT

Referring to FIG. 1, laser output beam is coupled through a hole or window 20 in one mirror 22 of an optical cavity which includes another mirror 24. The optical caivty 22–24 is positioned between opposing walls 26, 28 of a laser chamber 30. The exact geometry of the mirrors or apertures of the optical cavity 22, 24 is not germane to the present invention ,and a suitable optical cavity may be selected from among a wide variety of laser optic systems known in the art. The present invention may function as an optical oscillator or, for example, it may function as an optical amplifier by amplifying the intensity of a beam issuing from a separate laser oscillator.

To achieve lasing operation, molecular nitrogen or a mixture of molecular nitrogen and helium is provided by a source 32 which is coupled via suitable ductwork 34 to an insulating duct 36 which in turn is connected to a metallic end seal 38 which may also functionas one of the electrodes for an electric discharge. The electrode 38 is connected to a suitable power supply 40 which may be a high-voltage DC power supply with suitable ballast resistance of current limiting means in series with the connection to the electrode 38 or to a companion electrode 42, alternatively, AC or RF power supplies may be utilized if desired. Electrode 42 may be a combination of metallic clamping means for holding a discharge tube 44 which in turn may be made of quartz or suitable high-temperature glass or other insulating material. The nitrogen from the source 32 thus flows through the ducts 34, 36 into the discharge tube 44, within which an electric discharge is established between the electrodes 38, 42. This causes excitation of the nitrogen to suitable energy levels, and in fact, at appropriate voltages and pressures excitation into the first, second, and third vibrational level is highly probable. The excited nitrogen then flows into the laser chamber 30, past the optical cavity 22, 24 and out an exhaust duct 46 which may be maintained at a suitably low pressure by being connected to a vacuum pump, or other proper apparatus. The height of the laser chamber 30 in the vicinity of the optical cavity is generally less than the discharge tube diameter so that the height of the transition region between discharge tube 44 and the optical cavity axis converges. This permits widening of the flow to fill the entire length of the cavity from the volume of flow passed through the tube 44.

In order to achieve lasing, it is necessary that the energy in the nitrogen be transferred to a suitable lasing substance such as carbon dioxide, which substance achieves population inversion that results in photon emission in the presence of stimulating radiation to provide the laser output. In accordance with the present invention, carbon dioxide, or other lasing substance, is introduced into the stream of energizing gas, by means of an injection tube or manifold 48 which may be connected by one or more conduits 50, 52 and through a flexible conduit 54 to a source 56 of carbon dioxide (or otherlasing substance). The ducts 50, 52 are slidably journalled in what is commonly called quick disconnect seals, each of which is comprised of a main fixed threaded portion 58 and a cap portion 60 between which an O-ring 62 or other suitabl gasket may be compresed so as to provide a vacuum seal between the laser chamber 30 and the outside atmosphere while still permitting sliding of the ducts 50, 52. The carbon dioxide passed through the ducts 50, 52 is injected into the stream of energized nitrogen through a plurality of holes 64 in the injection pipe or manifold 48. In the embodiment of FIG. 1 the pipe 48 is positioned upstream (to the left) of the optical cavity 22, 24 and the direction of injection of $CO_2$ is downstream. Other embodiments of the invention, the injection tube or manifold 48 are described hereinafter with respect to FIGS. 4–9.

As seen in FIG. 1, there is provided an assembly 66 for moving the position of the lasing substance injection rod 48 such as by means of a reversible motor 68 together with a suitabl control 70. The motor 68 drives a pinion 72 which in turn drives a rack 74, the alignment of which is maintained by a frame 76. The rack 74 has affixed to it a clamp member 78 which is secured to the duct 52. Thus, as the motor 68 turns in response to a suitable electric power signal from the control 70, the pinion 72 may be turned clockwise or counterclockwise so as to drive the rack, and therefore the clamp 78 to the right or left, respectively, which in turn will move the duct 52 and therefore the rod 48 to the right or left within the laser chamber 30. In order to provide maximum control over alignment during the motion of the rod 48, the motor 68 may be provided with an additional pinion at its other end, with the aseembly 66 so arranged that an additional rack may be affixed to the duct 50 whereby motion of the motor would apply concomitant force to both ducts 50 and 52 simultaneously. The assembly 66 is shown in the simplified form of FIG. 1 in order to avoid confusion in the drawing. Suitable other arrangements may be utilized to drive the manifold 48, 50, 52, as well, of course, as adjusting the position of the rod 48 by hand.

In accordance with the present invention, it has been discovered that, in a gas-mixing laser (as described in the aforementioned Bronfin et al. and Brown et al. applications), the location of the mixing region relative to the optical cavity can have a critical effect on efficiency and power output. That is, because of parasitic depopylation of the upper laser level by undesirable collision processes and because this depopulation occurs at a finite rate, it is necessary to extract lasing output power from the gas within a very short span of time following mixing. At a given gas velocity this implies that the optical cavity must be located within a very short distance downstream of the injection manifold 48. This being so, our invention permits very precise control over the position of the introduction of $CO_2$ into the excited nitrogen, relative to the optical cavity 22, 24, whereby a maximum amount of stimulated photon emission may be collected from a given initial population inversion as useful output in a laser beam.

In a system operating at a high pressure within the laser chamber, from about 50 to 100 Torr, it has been found that the lasing substance may in fact be injected literally within the optical cavity, as is illustrated in phantom at 48a in FIG. 1. However, depending upon the various parameters of the system, it may be that the operating conditions will vary from time to time, and therefore, the feature of adjustability, as is described with respect to FIG. 1 hereinbefore, is advantageous.

The invention may also be practiced in a system in which the operating parameters are fairly closely controlled utilizing the lasing substance injecting rod or manifold 48 in a given fixed position. The invention practiced without adjusting the position of the rod is advantageous in contrast with injecting lasing substance through the walls of the chamber due to the fact that flow characteristics at the walls of the chamber render it difficult to get the proper dynamic flow conditions of the excitation gas and the lasing substance, including a proper mixture of these. Also, the use of the rod or manifold 48 even in a nonadjustable configuration insures maximum interaction between the energizing gas and the lasing substance within the effective dimensions of the optical cavity. In accordance with the present invention, achieving high laser power outputs require a close control over the interaction between the energization gas and the lasing substance, as described hereinbefore.

In FIG. 2, a plurality of discharge tubes 44a–44c are each suitably connected to a source of nitrogen or to a source of a mixture of nitrogen and helium, in a fashion similar to that of the embodiments of FIG. 1. Also, the embodiment of FIG. 2 illustrated that a complex manifold for the injection of $CO_2$ or other lasing substance may be utilized. In FIG. 2, the injection tube or manifold 120 is provided with one or more slots 122 through which the lasing substance flows into the lasing chamber 30. As seen more clearly in FIG. 3, the rod 120 is illustrated herein as comprising three slots with structural material in between so as to give structural strength to the rod. However, a single continuous slot may be utilized, or a plurality of holes may be utilized as illustrated in the embodiment of FIG. 1. The external manifold 123 supplying carbon dioxide to the rod 120 may include suitable proportioning so as to supply a uniform flow of $CO_2$ to each of the various portions or the rod, and may be provided with fittings(not shown, for simplicity) similar to the fittings 58–62 of FIG. 1 to permit movement of the rod 120 within the chamber 30 while maintaining a vacuum seal.

In FIGS. 1 and 2, the rods 48 and 120 are positioned upstream of the optical cavity with the $CO_2$ being released in a downstream direction directly toward the cavity. This is illustrated also in FIG. 4 wherein a portion of the optical cavity walls 130, 132 which would form the top and bottom of the optical cavity 30, are illustrated. The rod 48 may be of the type illustrated in FIG. 1 or of the type illustrated in FIGS. 2 and 3. As illustrated in FIG. 4, it is believed that the position of the rod 48 within the stream of nitrogen causes a certain amount of turbulence in the nitrogen which aids in the mixing of $CO_2$ with nitrogen as it passes through the optical cavity between the mirrors 22, 24. A similar result may be achieved in other ways as illustrated in FIGS. 5–8. In FIG. 5, the rod is positioned downstream of the optical cavity and the flow is released in an upstream direction. It is believed that the opposing flow causes mixing which has been found to be suitable for high-power operation of the laser. However, the configuration illustrated in FIG. 4 is generally to be preferred to that of FIG. 5 since higher power outputs have been obtainable therewith. In the embodiment of FIG. 6, a rod 48a has two sets of holes or slots illustrating that uniform mixing may be obtained by injecting the $CO_2$ slightly transversely with respect to the flow of nitrogen. Similarly, in FIG. 7, the rod 48b is provided with outlets at the top and bottom so that all of the $CO_2$ is released in a direction transverse to the flow of nitrogen. In FIG. 8, the rod 48 is located upstream of the cavity and directs a flow upstream to a baffle 134. In FIG. 9, the use of two injection rods or manifolds are shown. Of course, any of the configurations of FIGS. 4–8 may be utilized in combination in pairs or in greater numbers, such as the opposing rods illustrated in FIG. 10. Further, the combinations of FIGS. 4–10 might be combined with injection ports in the walls of the laser chamber as shown in FIG. 11. In addition, the invention specifically encompasses injection tubes with cross sections and shapes other than the cylindrical configurations illustrated in FIGS. 4–11. For high-velocity flows, and in particular for supersonic flows, it may be desirable to streamline the injection to cross section to reduce the tube drag, pressure drop and shock strength. Or it may be desirable to adjust the turbulence level and size downstream of the tube to arrive at an appropriate compromise between achieving complete mixing and reducing index-of-refraction gradients within the optical cavity.

FIG. 12 is a plan view of a laser similar to that illustrated in FIG. 1 but with a moving optical cavity assembly 140 having mirrors 22, 24 disposed thereon. As shown more clearly in the sectioned view of FIG. 3, the assembly 140 may preferably comprise a metallic cowl 142 wihch completely surrounds the walls (such as 130 and 132) of the laser cavity 30. The mirror structures 22, 24 are integrally formed on the cowl 142. Provision may be made for aligning the mirrors on the cowl 142. The cowl 142 is adapted to slide along the length of the laser cavity (upward and downward as seen in FIG. 12; from right to left in a view of a laser as illustrated in FIGS. 1 and 2). One method of automatically being able to adjust the position of the cowl 142, and therefore of the optical cavity 22, 24, is by means of four lead screws 144–147, two of which are shown in FIG. 12 and all of which are shown in section in FIG. 13. The lead screws 144–147 are each adapted to be threaded within a related ear 148–151 which are rigidly disposed on the cowl 142. Thus, by turning the lead screws 144–147, each corresponding ear 148–151 will be advanced along the screw, thereby drawing the cowl 142 into various positions. The lead screws 144–151 are each attached to a related sprocket; for simplicity, only the sprockets 152, 153 corresponding with lead screws 144, 145 are illustrated in FIG. 12. The sprockets 152, 153 (and an additional pair of sprockets corresponding to lead screws 146, 147) are driven by a chain 154 in response to a sprocket 156 iven by a motor 158. The motor may be of a conventional reversible type, and may be supplied with suitable controls such as the control 70 illustrated in FIG. 1.

Within the laser chamber 30, the pressure will normally not be ambient. In electric discharge gas lasers of the type illustrated in FIGS. 1–11 herein, the pressure is usually low, on the order of magnitude of 10–100 Torr. Thus, a seal for fluid under pressure must be provided between the sliding cowl 142 and the walls of the laser chamber 30. One suitable method of sealing the cowl so as to be able to withstand differentials in fluid pressure between ambient and the laser chamber 30 is illustrated in FIGS. 14 and 15. In FIG. 14, the cowl 142 is shown in phantom, the view being directly against a sidewall 160 of the laser chamber 30. The wall 160 has a window 162 of a sufficient width (fron top to bottom, as in FIG. 14) so as to not block the mirrors, 22, 24 (the mirror 24 being shown in phantom in FIG. 14). The window 162 is long enough to permit relative motion (from left to right in FIG. 14) of the cowl 160 without obstructing the operation of the potical cavity between the mirrors 22 and 24. Completely surrounding the window 162 is a groove 164 (FIG. 15) within which is seated an O-ring 166 (FIGS. 14 and 15) that provides the fluid seal between the walls of the laser chamber 30 and the cowl 160. As seen in FIG. 15, a plurality of bearings 168 may be provided in hardened seats 170 within the cowl 142 so asto provide easy rolling for the cowl thereby to avoid any tendency towards binding as the position of the cowl 142 is adjusted. The bearings 168 are shown in phantom in FIG. 14. The size of the bearings and the size of the O-ring, as well as the depth of the groove 164 which contains the O-ring, are preferably so adjusted so that only a slight compression of the O-ring 166 occurs. This will therefore maintains a pressure seal while allowing relatively free sliding across the O-ring 166.

In operation the embodiment of FIGS. 12–15 perform in a fashion similar to the embodiment of FIGS. 1 and 2. Specifically, once the laser has established operation with a given set of parameters (pressure, velocity, etc., as described hereinbefore), the position of the optical cavity 22, 24 is adjusted relative to the position of the rod 120 (shown in phantom in FIG. 12) so as to achieve maximum lasing output.

The present embodiments are disclosed and described primarily in terms of a nitrogen/carbon dioxide mixing laser, but it should be understood that the present invention may be practiced utilizing various combinations of substances, including nitrogen/nitrous oxide, carbon monoxide/carbon dioxide, nitrogen/water vapor/carbon dioxide, helium/neon and other gas combinations, and including lasing substance introduced into the flow in a nongaseous state, but which evaporate prior to entering the active lasing region. Similarly, various configurations other than those disclosed and described herein may be readily adapted to practice the present invention. The invention is disclosed herein with respect to a gas dynamic laser which is electrically excited by means of a gas discharge, but the principle of injecting the lasing substance into the energizing flow directly at the potical cavity and of adjusting the relative position of this injection with the position of the optical cavity, may be utilized in systems in which the energizing gas is thermally, chemically, or otherwise excited; the nature of the energization is not pertinent to the present invention. Thus, the invention may be utilized in any gas dynamic laser of the mixing type.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of our invention, that which we claim as new and desire to secure by Letters Patent of the United States is:

1. A gas-mixing laser comprising:
    a laser chamber;
    an optical cavity disposed within said laser chamber;
    means for flowing an energizing gas through said optical cavity; and
    means disposed within said laser chamber for introducing a lasing substance into said laser chamber, said means and said optical cavity being so disposed relative to said laser chamber so as to be adjustably disposed relative to each other in a direction substantially perpendicular to the optical axis of said optical cavity.

2. The laser according to claim 1 wherein said lasing substance introducing means is adjustably disposed relative to said laser chamber.

3. The laser according to claim 1 wherein said optical cavity is adjustably disposed with respect to said laser chamber.

4. The laser according to claim 1 additionally comprising:
    means for adjusting the relative positions of said lasing substance introducing means and said optical cavity.

5. The laser according to claim 4 wherein said adjusting means is operative to move the position of said lasing substance introducing means relative to said laser chamber.

6. The laser according to claim 4 wherein said adjusting means is operative to move the position of said optical cavity relative to said laser chamber.

7. The laser according to claim 1 wherein said lasing substance introducing means comprises a plurality of manifolds disposed in proximity with said optical caivty.

8. A laser according to claim 7 wherein at least one of said manifolds is upstream of the axis of said optical cavity and at least one of said manifolds is downstream of the axis of said optical cavity.

9. A laser according to claim 3 further including duct means pentrating the wall of said laser chamber in proximity with said optical cavity for introducing a lasing substance into the laser chamber.

10. A gas-mixing laser comprising:
a laser chamber;
means for flowing an energizing gas through said laser chamber, including means for exciting said energizing gas;
an optical cavity disposed in said laser chamber; the axis of said optical cavity being perpendicular to the flow of energizing gas through said laser chamber; and
means disposed within said laser chamber and at least partially within said optical cavity for introducing a lasing substance into the laser chamber.

11. The laser according to claim 10 wherein said lasing substance introducing means is disposed between the axis of said optical cavity and said exciting means.

12. The laser according to claim 10 wherein said lasing substance introducing means includes means to direct the lasing substance generally downstream in the flow of energizing gas.

13. The lase raccording to claim 10 including a baffle disposed near said lasing substance introducing means and wherein said lasing substance introducing means includes means in direct the lasing substance generally toward said baffle.

14. The laser according to claim 1 wherein said lasing substance injection means comprises a plurality of manifolds disposed in proximity with said optical cavity.

15. A gas-mixing laser comprising:
a laser chamber;
means for flowing an energizing gas through said laser chamber, including means for exciting said energizing gas;
an optical cavity disposed in said laser chamber; the axis of said optical cavity being perpendicular to the flow of energizing gas through said laser chamber; and
means disposed within said laser chamber in close proximity with said optical cavity and downstream of the optical axis thereof for introducing a lasing substance into the laser chamber and for directing said lasing substance generally toward said optical axis.

16. A gas-mixing laser comprising:
a laser chamber;
means for flowing an energizing gas through said laser chamber, including means for exciting said energizing gas;
an optical cavity disposed in said laser chamber; the axis of said optical cavity being perpendicular to the flow of energizing gas through said laser chamber; and
a plurality of manifolds disposed within said laser chamber in close proximity with said optical cavity for introducing a lasing substance into the laser chamber, at least one of said manifolds being upstream of the axis of said optical cavity and at least one of said manifolds being downstream of the axis of said optical cavity.